April 27, 1954   J. CONNING   2,676,389
METHOD OF APPLYING METAL SHEATHS TO ELECTRIC CABLES
Filed Jan. 25, 1951   2 Sheets-Sheet 1
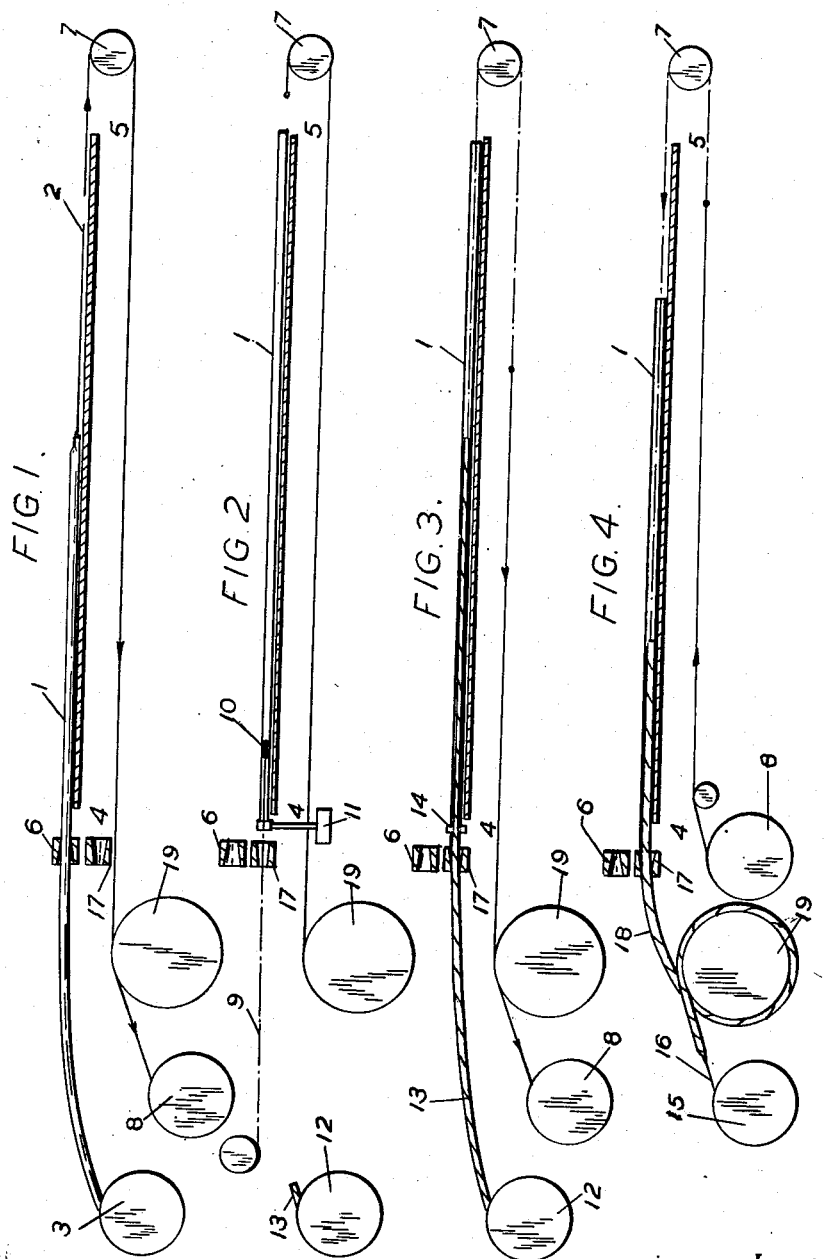
Inventor
James Conning
By Hoopes Leonard & Deem
Attorneys

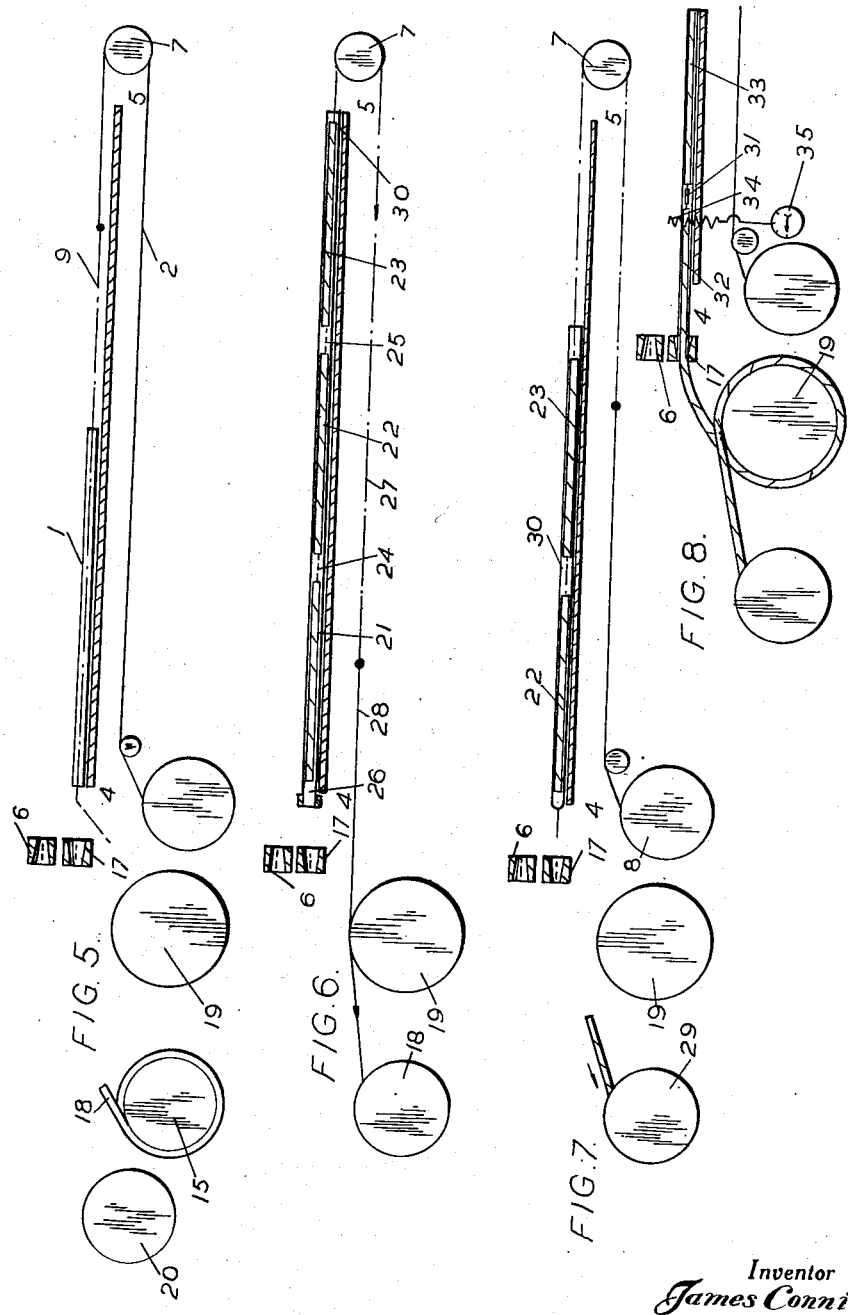

Patented Apr. 27, 1954

2,676,389

UNITED STATES PATENT OFFICE 2,676,389

METHOD OF APPLYING METAL SHEATHS TO ELECTRIC CABLES

James Conning, Bexley, England, assignor to British Insulated Callender's Cables Limited, London, England, a British company Application January 25, 1951, Serial No. 207,733

Claims priority, application Great Britain February 22, 1950

6 Claims. (Cl. 29—148)

This invention relates to the method of applying a metal sheath, particularly an aluminum sheath, to an electric cable in which the cable body is drawn into a metal pipe and the diameter of the metal pipe is subsequently reduced to make it fit on the cable body. There are three essential steps in such methods, namely:

1. Laying out a length of the pipe on a suitable support;
2. Drawing or otherwise inserting the cable body into the pipe;
3. Reducing the diameter of the pipe containing the cable body.

The last operation is normally carried out by drawing the pipe containing the cable body through a suitable die and at the same time removing it from the support and coiling it onto a drum.

In the methods of this kind at present in use or proposed, the length of pipe laid out on the support has been sufficient to manufacture one cable length only and the length of cable body inserted in this pipe has been such that when the pipe is drawn down it will approximately fill it.

The present invention is an improved method of the kind referred to, having a number of practical advantages over methods of this kind previously proposed.

In the method in accordance with the invention the first step is to lay out a length of pipe, longer than is needed for the manufacture of one cable length, on a suitable support. This support may be straight or curved or partly straight and partly curved, the curves being of a sufficiently large radius. For convenience of reference the end of the pipe into which a cable body is first inserted will hereinafter be referred to as the forward end and the other end as the rear end. The same terms will be used to denote the ends of the support. The pipe may be drawn onto the support from either end and during the laying out it may be subjected to operations such as straightening and bringing to true shape in cross-section. After, or during, the laying out of the pipe, it is threaded with a tow-line, for example by attaching the tow-line to a plug which is blown through the pipe by air pressure. The end of the tow-line projecting from the forward end of the pipe is now attached to the end of a cable body, which is long enough to make a cable of the length required, and this body is pulled into the pipe by means of the tow-line until the whole of it is inside the pipe.

From this stage the procedure may vary. In the preferred method the forward end of the pipe and of the cable body are attached to a length of tow-line and the pipe is drawn by this tow-line through a device, such as a die, for reducing the diameter of the pipe, by means of a suitable take-up device until one cable length has been manufactured. The reducing device is situated near the forward end of the support. During this operation the end of the cable body remote from the forward end of the support remains attached to the tow-line for the cable body passing through the pipe and if necessary braking may be applied to maintain the cable body under tension.

At or just before completion of the reducing operation the pipe is severed at the point where the attachment between the end of the cable body and its tow-line is situated and the cable body is detached from the tow-line.

On completion of the reducing operation the situation is that there is a length of pipe (shorter than that originally laid out) on the support with one end adjacent to the forward end and in this pipe there is a tow-line with a free end at the forward end of the pipe. A further length of cable body sufficient to make another cable length, is now pulled into the pipe by means of the tow-line and the reducing operation repeated. The complete operation can be repeated a number of times until all of the pipe length originally laid out has been used. For example, the support may be 600 yards long and a single 600 yard length of pipe may be used to manufacture three cable lengths each over 200 yards long.

In a variation of the procedure just described, when the first cable body is wholly inside the pipe, instead of commencing the drawing down of the pipe a second cable body is attached to the forward end of the first cable body and is pulled into the pipe by pulling the first cable body further into the pipe by means of the tow-line. By a similar method further cable bodies may be pulled simultaneously into the pipe until the total length of the cable bodies in the pipe is equal to the length which can be sheathed by means of the pipe and the forward end of the last length of cable body pulled into the pipe is at or near the forward end of the pipe. The procedure now continues similarly to that first described, except that the step of pulling further cable lengths successively into the pipe between each of the drawing down operations is obviated.

A further variation of the procedure is a combination of those already described. In this procedure more than one length of cable body is pulled into the pipe before the first drawing down operation but after these lengths have been sheathed, sufficient pipe is left to manufacture one or more further cable lengths. The cores for these further lengths are then pulled into position singly or end to end.

In all varieties of the method in accordance with the invention it is possible to sheath a number of cable bodies of different size and different construction, provided that they are all suitable for sheathing by the length of pipe laid out on the support. Between each drawing down operation the die will be changed if necessary.

From the above general description of the method of the present invention it will be seen that the three essential steps first quoted and numbered 1-3 have been modified by the presen invention as follows:

(1) The length of pipe laid out is sufficient to sheath more than one cable length.

(2) A number of cable bodies are pulled successively or simultaneously into the pipe by means of a single tow-line.

(3) More than one cable length is produced from the single length of pipe by drawing the pipe from the forward end of the support through a reducing device and severing it at the end of each cable length, utilising cable bodies already in the pipe or cable bodies pulled into the pipe as required by means of the tow-line which remains in the pipe.

A further feature of the present invention is the provision of means for indicating, during the reducing operation, when the end of a cable body is approaching the reducing device. This indication is given by arranging a suitable object, for example, a body of magnetic material, of a size suitable for insertion in the pipe, between the end of the tow-line for the cable body and the cable body or between cable bodies when more than one is drawn into the pipe. On the outside of the pipe near the reducing device, there is arranged a device capable of detecting and indicating the presence of this body, for example a coil, carrying alternating current, surrounding the pipe and connected in series with an electric instrument which indicates a change of the current in the coil when the body passes through it. Another example of a suitable indicating object and indicating device is a magnet for insertion in the pipe and a magnetic detector arranged outside the pipe.

Examples of the method of applying metal sheaths to a number of cable bodies utilising a single length of pipe in accordance with the invention will be described with reference to the accompanying drawings in which Figures 1, 2, 3, 4 and 5 show diagrammatically five steps in the method in accordance with the preferred procedure, Figures 6 and 7 show alternative steps which may be employed in a variation of this procedure and Figure 8 shows diagrammatically the use of detecting apparatus in the method in accordance with the invention.

Referring to Figures 1, 2, 3, 4 and 5 of the drawings, Figure 1 shows a length of aluminium pipe 1 being drawn by means of a hawser 2 from a supply drum 3 onto an elongated support indicated diagrammatically by 4, 5. The end 4 of the support will hereinafter be referred to as the "forward" end. Between the supply drum 3 and the forward end of the support 4 is arranged a straightening die 6 through which the pipe is drawn and which removes any irregularities from it before it passes onto the support 4, 5.

The support 4, 5 is preferably straight but may have in it some curves of a radius sufficiently large to avoid damaging the pipe and to enable the subsequent operations to be carried out as will be described. It may consist, for example, of a horizontal rigid frame-work carrying a number of horizontal rollers, for supporting the pipe, arranged with their axes transverse to the axis of the pipe and a number of vertical rollers arranged on either side of the centre line of the support at less frequent intervals than the horizontal rollers, their function being to prevent the pipe from falling from the support. Where the support is curved, vertical rollers at more frequent intervals will be required on the inside of the curve to maintain the pipe on the support. The hawser 2 passes over a fixed pulley 7 at the rear end of the support and back, parallel with the support, onto a take-up drum 8 which is driven by a suitable source of power (not shown). The hawser 2 may conveniently be attached to the end of the pipe 1 by crimping the pipe onto a draw-bar as described in co-pending United Kingdom application No. 3,384/50 dated September 2, 1950.

When sufficient of the pipe has been laid out on the support, the pipe is severed near the straightening die 6 and the rear end of the pipe is detached from the hawser 2. A tow-line consisting of a hawser of smaller diameter than the hawser 2 is now passed through the pipe on the support from the forward end and attached to the end of the hawser 2, which is now at the rear end of the support. A convenient method of passing the tow-line through the pipe is to attach a plunger to the end of the tow-line, insert this plunger in the forward end of the pipe and blow compressed air into the forward end of the pipe to carry the plunger with the tow-line through the pipe.

Figure 2 shows the tow-line 9 attached to a plunger 10 which is being blown through the pipe 1 by compressed air supplied from a compressor 11. At this stage the supply drum 3 carrying the remainder of the pipe not used is removed and replaced by a drum 12 carrying a cable body. After the rear end of the tow-line has been attached to the end of the hawser 2, the forward end of the tow-line is attached to the free end of the cable body on the drum 12.

The next stage is the pulling of a cable body 13 into the pipe 1; this operation is shown in progress in Figure 3. During this operation the forward end of the pipe is secured by a ring 14. The pipe 1 is considerably longer than the cable body 13 so that, when the end of the cable body 13 opposite to that attached to the tow-line 9 has passed into the pipe 1, the cable body 13 is wholly within the pipe and does not project from the rear end of the pipe. At this stage the drive to the take-up drum 8 is stopped and the drum 8 is removed to the position shown in Figure 4 and replaced by a take-up drum 15 for the finished cable. A short length of hawser 16 is now attached to the forward ends of the cable body 13 and of the pipe 1 and this hawser 16 is passed through a reducing die 17, once round a capstan 19 and onto a take-up drum 15. The hawer 16 may be attached to the cable body 13 and the pipe 1 by the method described in co-pending United Kingdom application No. 3384/50 dated September 2, 1950.

The capstan 19 and the take-up drum 15 are now driven in a direction such that the pipe 1 containing the cable body 13 is drawn from the support through the reducing die 17 and coiled on the drum 15. The aperture of the die 17 is of a size such that the diameter of the pipe 1 is reduced sufficiently to make the cable body 13 as tight a fit in the pipe 1 as is required in the type of cable being manufactured. When the end of the cable body 13 which is attached to the tow-line 9 approaches the reducing die 17, the capstan 19 is stopped and the pipe 1 is severed adjacent to the end of the cable body 13. The remainder of the sheathed cable 18 is then reeled into the drum 15 and the position is as shown in Figure 5, that is, a length of pipe 1 remains on the support 4, 5 with one end near the forward end of the support and the tow-line 9 remains in this length of pipe with a free end at the forward end of the support.

The drum 15 carrying the sheathed cable is now removed and replaced by the drum 8 (as in Figure 3). A second cable body is now pulled into the pipe length 1 from a supply drum 20 (Figure 5) and the whole operation repeated from the stage shown in Figure 3. Further cable bodies can be sheathed successively by similar operations until no pipe remains on the support.

In one series of operations of the kind described above the pipe laid out was 410 yards (375 metres) long, had an outside diameter of 1.17 inches (2.97 cm.) and a wall thickness of 0.056" (1.42 mm.). Three cable bodies were sheathed from this length of pipe. The following table gives the lengths and diameters of the cable bodies and the outside diameters of the sheaths of the finished cables:

| Cable body No. | diameter | | length | | outside diameter of sheath | |
|---|---|---|---|---|---|---|
| | inches | cms. | yds. | metres | inches | cms. |
| 1 | .753 | 1.92 | 221 | 202 | .879 | 2.23 |
| 2 | .762 | 1.94 | 186 | 170 | .888 | 2.26 |
| 3 | .886 | 2.25 | 110 | 101 | 1.012 | 2.58 |

After completion of the sheathing operations about 2 yards (2 metres) of the pipe remained unused.

Between the operations of sheathing each cable body the reducing die was changed so that the appropriate reduction in diameter of the pipe for each cable body being sheathed was obtained. The method is equally applicable to the sheathing of a number of cable bodies of the same diameter and/or length. When they are of the same diameter no changing of the die will be required unless it is desired to obtain a different clearance between the cable body and sheath in the different cable lengths being manufactured.

Figures 6 and 7 show stages in an alternative procedure in which three cable bodies 21, 22, and 23 are coupled together end to end by short lengths of hawser 24 and 25 and pulled simultaneously into a pipe 26 by means of a tow-line 27 attached to a hawser 28. The first cable is sheathed by drawing the forward end of the pipe and the cable body through the reducing die 17 until the end of the cable body 21 which is attached to the hawser 24 reaches the end of the support. The pipe is then cut at the end of the cable body. The sheathed cable body is reeled onto a take-up drum 29 (Figure 7) leaving a length of pipe 30 containing cable bodies 22 and 23 on the support, as shown in Figure 7. This operation is repeated to sheath the cable bodies 22 and 23.

In both of the procedures described, in order to utilise the whole of the pipe length laid out on the support the last cable body to be sheathed may be made to project from the rear end of the pipe by an amount such that the lengthening of the pipe during its passage through the reducing die will cause it to cover the projecting part of the cable body. In such cases the method described in co-pending United Kingdom application No. 3383/50 dated September 2, 1950, may be used to provide a protection for the projecting part of the cable body.

Figure 8 illustrates diagrammatically one form of detecting apparatus which may be used to indicate the position of the end of a cable body inside the pipe. A small cylindrical body 31 of magnetic material is inserted in the link between the ends of the two cable bodies 32 and 33. A detecting coil 34 surrounds the pipe near to the reducing die. This coil is connected to a galvanometer 35 which indicates the current generated in the coil by the passage of the body 31 through it. This arrangement provides an accurate method of locating the end of a cable body so that the pipe can be severed in the correct position when the sheathing of one cable body is nearing completion. An alternative method of locating the end of a cable body is to make a mark on the part of the hawser 2 between the pulley 7 and drum 8, lying parallel with the pipe at the forward end of the support (Figure 1), corresponding to the position of the end of a cable body just as this cable body is beginning to pass into the end of the pipe. During the sheathing of the cable body the hawser 2 is pulled off the take-up drum 8 and when this mark again coincides with the end of the support it is known that the end of the cable body being sheathed will also be at the end of a support. A similar procedure can be adopted for the indication of the ends of cable bodies subsequently sheathed from the same pipe.

One advantage of the present invention is that after a single operation of laying out a length of pipe several cable lengths can be manufactured these lengths being, if desired, of different size and construction. Another advantage is that except in the case of the last cable length manufactured from the single length of pipe, it is not necessary to provide means for protecting an excess length of cable body projecting from the end of the pipe. The method can also most conveniently be carried out with all of the necessary apparatus situated at one end of the support. This simplifies the supervision of and housing of the apparatus. The apparatus may, for example, be inside the factory while the greater length of the support projects into the open or is provided with only a simple protection, such as a narrow cover.

What I claim as my invention is:
1. A method of applying metal sheaths to a plurality of electric cable bodies differing from each other in at least one of the following characteristics, external diameter and internal construction, which comprises the steps of laying out on a suitable support a continuous pipe of length at least sufficient to sheath all of said cable bodies, inserting a tow-line through said pipe, pulling into said pipe by means of said tow-pipe, pulling into said pipe by means of said tow-line at least one of said cable bodies until the end of a cable body which is wholly within the pipe is at or near the forward end of said pipe, drawing said pipe by its forward end through a reducing device until said last-mentioned cable body has been sheathed, severing the pipe at the end of the cable thus manufactured and sheathing the remainder of said cable bodies from the residual length of said pipe by a similar method, changing the reducing device as necessary and pulling further of said cable bodies into said pipe, if required, by means of said tow-line which remains threaded through the residual length of said pipe.

2. A method of applying metal sheaths to a plurality of electric cable bodies differing from each other in at least one of the following characteristics, external diameter and internal construction, which comprises the steps of laying out on a suitable support a continuous pipe of length at least sufficient to sheath all of said cable bodies, inserting a tow-line through said pipe, pulling into said pipe by means of said tow-pipe, pulling into said pipe by means of said tow-line all of said cable bodies attached end to end until the last cable body to enter said pipe is wholly within said pipe with its end at or near the forward end of said pipe, drawing the pipe by its forward end through a reducing device until said last-mentioned cable body has been sheathed, severing the pipe at the end of the cable thus manufactured and sheathing each of the remainder of said cable bodies from the residual length of pipe by a similar method, changing the reducing device as necessary.

3. A method of applying metal sheaths to a plurality of electric cable bodies differing from each other in at least one of the following characteristics, external diameter, internal construction which comprises the steps of laying out on a suitable support a continuous pipe of length at least sufficient to sheath all of said cable bodies, inserting a tow-line through said pipe, attaching said tow-line to the end of one of said cable bodies, arranging an indicating object at the point of attachment, pulling said cable body into said pipe by means of said tow-line until said cable body is wholly within said pipe with an end at or near the forward end of said pipe, arranging an indicating device adjacent to the said pipe at or near the forward end of said support, drawing said pipe from its forward end through a reducing device until said cable body has been sheathed, the approach of the end of said cable body being indicated by a reaction between said indicating object within said pipe and said indicating device, severing said pipe at the end of the cable thus manufactured, sheathing the remainder of said cable bodies from the residual length of pipe by a similar method, changing the reducing device as necessary, said cable bodies being drawn into the pipe as required by means of said core tow-line which remains threaded through the residual length of said pipe, an indicating object being arranged at the point of attachment between each further cable body and the tow-line.

4. A method of applying metal sheaths to a plurality of electric cable bodies which differ from each other in at least one of the following characteristics, external diameter, internal construction which comprises the steps of laying out on a suitable support a continuous pipe of length at least sufficient to sheath all of said bodies, inserting a tow-line through said pipe, attaching said tow-line to the free end of one of said bodies, attaching all of said cable bodies end to end, arranging an indicating object at each point of attachment, pulling said cable bodies into said pipe by means of said tow-line until the last of said cable bodies to enter the pipe is wholly within said pipe with its free end adjacent to the forward end of said pipe, arranging an indicating device adjacent to said pipe at or near the forward end of said support, drawing said pipe from its forward end through a reducing device until a cable body has been sheathed, the approach of the end of the said cable body being indicated by a reaction between one of said indicating objects within said pipe and said indicating device, severing said pipe at the end of the cable thus manufactured and sheathing the remainder of said cable bodies from the residual length of pipe by a similar method, changing the reducing device as necessary.

5. A method of applying metal sheaths to a plurality of electric cable bodies differing from each other in at least one of the following characteristics, external diameter and internal construction, which comprises the steps of attaching a continuous pipe of length sufficient to sheath all of said cable bodies to a hawser passing over a pulley at the near end of an elongated support, taking up said hawser by means located at the forward end of said support until said pipe is wholly on said support, inserting a tow-line through said pipe, attaching said tow-line to said hawser, attaching to said tow-line at least one of said cable bodies, taking up said hawser until the end of a cable body which is wholly within the pipe is at or near the forward end of said pipe, drawing said pipe by its forward end through a reducing device until said last-mentioned cable body has been sheathed, severing the pipe at the end of the cable thus manufactured and sheathing the remainder of said cable bodies from the residual length of said pipe by a similar method, changing the reducing device as necessary and pulling any of said cable bodies not in said pipe into said pipe as required by means of said tow-line, which remains in the residual length of said pipe and said hawser.

6. A method of applying metal sheaths to a plurality of electric cable bodies differing from each other in at least one of the following characteristics, external diameter, internal construction which comprises the steps of attaching a continuous pipe of a length sufficient to sheath all of said cable bodies to a hawser passing over a pulley at the rear end of an elongated support, taking up said hawser by means located at the forward end of said support until said pipe is wholly on said support, inserting a tow-line through said pipe, attaching said tow-line to said hawser, attaching to said tow-line all of said cable bodies end to end, taking up said hawser until the end of the last cable body to enter the pipe is wholly within said pipe with its end at or near the forward end of said pipe, drawing the pipe by its forward end through a reducing device until said last-mentioned cable body has been sheathed, severing the pipe at the end of the cable thus manufactured and the remaining cable bodies from the residual length of pipe by a similar method, changing the reducing device as necessary.

References Cited in the file of this patent

UNITED STATES PATENTS

| Number | Name | Date |
|---|---|---|
| 182,485 | Saul | Sept. 19, 1896 |
| 1,271,320 | Housekeeper | July 2, 1918 |
| 2,132,258 | Elmer | Oct. 4, 1938 |
| 2,287,460 | | |
| 2,308,120 | | |
| 2,386,119 | | |
| 2,607,109 | | |

| Number | Name | Date |
|---|---|---|
| | Wagenhals et al. | June 23, 1942 |
| | Staples | Jan. 12, 1943 |
| | Jack | Oct. 2, 1945 |
| | Reynolds | Aug. 19, 1952 |

FOREIGN PATENTS

| Number | Country | Date |
|---|---|---|
| 627,815 | Great Britain | Aug. 16, 1949 |